United States Patent [19]
Hinderer et al.

[11] Patent Number: 5,800,584
[45] Date of Patent: Sep. 1, 1998

[54] OIL SEPARATOR

[75] Inventors: Heiko Hinderer, Remseck; Lothar Keller, Stuttgart; Guenter Jokschas, Murrhardt; Michael Wolf, Gaeufelden, all of Germany

[73] Assignee: Filterwerk Mann & Hummel GmbH, Ludwigsburg, Germany

[21] Appl. No.: 897,531

[22] Filed: Jul. 21, 1997

Related U.S. Application Data

[63] Continuation of Ser. No. 511,661, Aug. 7, 1995, abandoned.

[30] Foreign Application Priority Data

Aug. 5, 1994 [DE] Germany .............. 44 27 753.9

[51] Int. Cl.$^6$ .................................................. B01D 46/24
[52] U.S. Cl. .................. 55/482; 55/498; 55/502; 55/504
[58] Field of Search ............... 55/482, 486, 487, 55/498, 502, 504, 510; 95/143, 286, 287; 96/189, 190, 191; 210/497.01, DIG. 5

[56] References Cited

U.S. PATENT DOCUMENTS

| | | | |
|---|---|---|---|
| 3,386,230 | 6/1968 | Riesberg et al. | 55/498 |
| 3,505,794 | 4/1970 | Nutter et al. | 55/502 |
| 3,517,820 | 6/1970 | Mintz | 210/491 |
| 3,802,160 | 4/1974 | Foltz | 55/498 |
| 4,124,360 | 11/1978 | Berger, Jr. et al. | 96/191 |
| 4,632,682 | 12/1986 | Erdmannsdörfer | 55/498 |
| 4,878,929 | 11/1989 | Tofsland et al. | 55/486 |
| 5,015,375 | 5/1991 | Fleck | 55/502 |
| 5,129,923 | 7/1992 | Hunter et al. | 55/486 |
| 5,476,585 | 12/1995 | Mills | 55/502 |
| 5,484,466 | 1/1996 | Brown et al. | 55/502 |
| 5,605,625 | 2/1997 | Mills | 55/502 |

FOREIGN PATENT DOCUMENTS

| | | |
|---|---|---|
| 2003972 | 3/1969 | France . |
| 8501736 | 10/1985 | Germany . |
| 988692 | 4/1965 | United Kingdom . |
| 2063098 | 6/1981 | United Kingdom . |
| 1602686 | 11/1981 | United Kingdom . |
| 2119674 | 11/1983 | United Kingdom . |
| 94/13389 | 6/1994 | WIPO . |

*Primary Examiner*—Duane S. Smith
*Attorney, Agent, or Firm*—Evenson, McKeown, Edwards & Lenahan, PLLC

[57] ABSTRACT

An oil separator for separating oil from oil-laden air has a housing, an inlet for oil-charged air to enter the housing, one or more coalescer elements arranged on a support body inside the housing, and outlets for the separated air and for the separated oil to exit the housing. Each end of the support body and a corresponding end of the coalescer element are fastened to a molded component. At least one molded component is in sealing contact with a sealing surface of the housing.

11 Claims, 4 Drawing Sheets

OIL SEPARATOR

This application is a continuation of application Ser. No. 08/511,661 filed on Aug. 5, 1995, now abandoned.

Background of the Invention

This invention relates to an oil separator, particularly to an oil separator having a housing with an inlet for oil-laden air, a coalescer element on a support body, and outlets for the separated oil and for the separated air.

Oil separators of this type are used especially for recovering finely divided oil in the compressed air produced in oil-flooded turbochargers. The droplet size of the oil to be separated is comparatively small and extends into the aerosol range with drop diameters smaller than 0.1 µm. In order to separate the largest possible percentage of the oil, graded separators are provided in which the first separating element has a coarser texture than the following second separating element.

In an oil separator disclosed in British Patent No. GB 988,692, the inner, coarser separating element and the outer, finer separating element are provided with a common bottom. As a result, all of the oil that settles on the bottom of the annular chamber, between the outer and inner oil separating elements, must pass through the inner separating element in order to be drawn out by the first oil exhaust tube.

Furthermore, German Utility Model No. DE-G 85 01 736discloses an apparatus for the separation of oil droplets from air. The separating element is configured as an annular coalescer which consolidates the fine oil droplets into larger oil droplets which settle downward by gravity in the separating element and downstream therefrom. To replace the oil separator the entire element is unscrewed from the mounting head and replaced with a new element. The disposal of the entire element when replaced is a disadvantage.

Recyclability is of primary importance in waste disposal. In the case of these known replaceable oil separator elements, care must be taken in recycling to separate them into their raw material components. Since the known separator element consists of a number of different materials, separation of the materials is impossible or is possible only with unreasonably great difficulty.

SUMMARY OF THE INVENTION

An object of the present invention is to provide an oil separator that is simple to make, reasonable in cost, and which is readily recyclable.

This object has been achieved by providing an oil separator having a housing, an inlet for oil-charged air to enter the housing, one or more filter elements arranged on a support body inside the housing, outlets for the separated air and for the separated oil, with ends of the filter element and support body being fastened to respective molded components, at least one of which is in sealing contact with a surface of the housing.

A particular advantage of the invention results from providing a separator that is equipped with the smallest possible number of metal parts. A metal support is provided on which the coalescer element is disposed. The support and coalescer element are embedded at their ends in a molded component. This molded component simultaneously serves a sealing function, i.e., due to the special configuration of the molded component an axial or radial seal is formed which separates the inlet chamber of the oil separator from the oil-free chamber at the discharge end. The coalescer element may have a circular or polygonal (including triangular or quadrilateral) cross section.

According to a further embodiment of the invention, provision is made for the coalescer element to be followed by an additional separating element. This separating element serves primarily to trap the oil droplets formed in the coalescer element and conduct them into the oil collecting area. For this purpose this element is constructed as a filter which lets the oil-stripped air flow through and removes the separated oil. The coalescer element and the separating element may be formed of a foam material or a woven or nonwoven web material. The web material may be a wound, air-permeable material.

According to one advantageous embodiment of the invention, a "two-component process" method is used to make the molded component. The molded component in this case is made from two different materials. A first component is applied in a first process step. This component seals the end of the coalescer element and connects the coalescer element and the support. In a second process step a second component which has rubber-like resilient properties is applied to the first component and serves to seal the coalescer element with respect to the housing.

In another embodiment of the invention the coalescer element is removably disposed in the housing by means of a central screw connection. Thus it can be quite easily taken out of the housing and replaced with a new element.

In another advantageous embodiment the supporting tube is releasably fastened to the coalescer element. This allows the metal supporting tube to be removed from the coalescer element, i.e., from the fleece material, simply by severing or cutting open the metal supporting tube.

Likewise, an external jacket, if it is necessary, can be removably attached to the coalescer or to the supporting tube. The seal between the coalescer element and housing may, as already mentioned, be achieved with a two-component material. It is also possible to use an O-ring instead of an elastomeric material or to select a different form of gasket permitting an axial or radial seal.

These and additional features of preferred embodiments of the invention are found in the specification and the drawings. It is to be understood that the individual features may be implemented separately or in combination, and may represent advantageous as well as separately patentable constructions.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
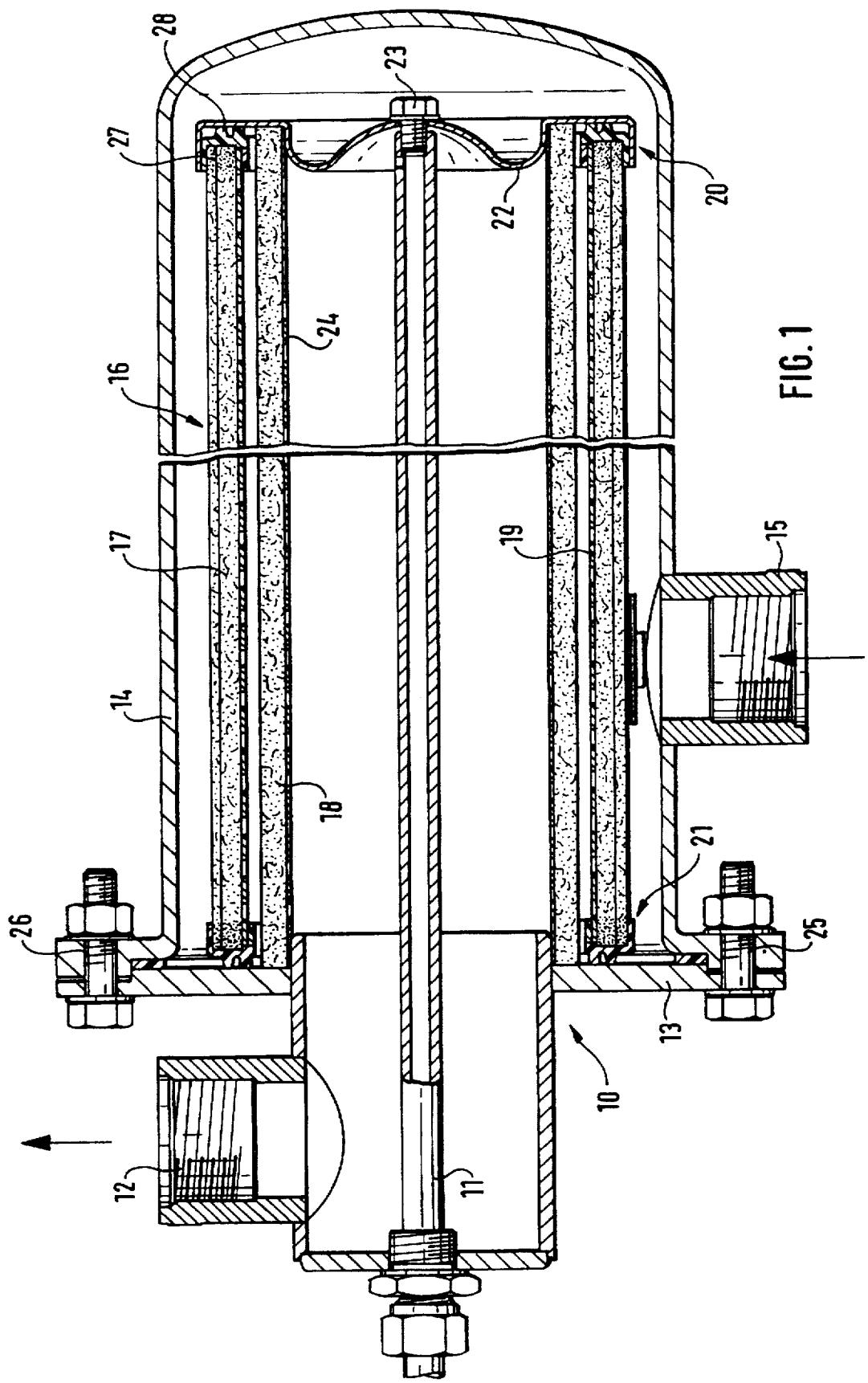
FIG. 1 is a sectional view of an oil separator.

The oil separator according to FIG. 1 comprises a mounting head 10. Supported on this mounting head are an oil drain tube 11, a discharge tube 12 through which the air stripped of oil is discharged, and a mounting flange 13 for mounting the housing 14. An inlet opening 15 is disposed on the housing 14. The oil-laden air flows into the element through this inlet opening.

A de-oiling filter element 16 is disposed within the housing 14. This filter element consists of a first coalescer element 17 which is a cylindrical, tubular or accordion-pleated element, as well as a second separating element 18. The coalescer element 17 rests on a support body 19 and is provided at the ends with gaskets 20 and 21. The gaskets 20 and 21 consist of molded components to which the ends of the coalescer element are fastened. The molded component has a configuration similar to a lipped gasket at the end surface. A radial seal is achieved due to the elasticity of the molded component.

At the end opposite the mounting head 10, the filter element 16 is sealed against an end plate 22. This end plate is fastened to the oil drain tube 11 by a bolt 23. The separating element 18 is also fastened on the supporting tube 24 and is placed over the mounting head 10 and held in place by the end plate 22.

To replace the coalescer element, the housing 14 is opened (i.e., the screw fastenings 25 and 26 are unscrewed), and the end plate 22 is removed. Then the coalescer element 17 can be removed. In like manner the separating element 18 can be replaced, if necessary. To aid in the disposal of the coalescer element, the end portions with the gaskets are severed. Then the middle portion, i.e., the nonwoven material, can be separated from the metal supporting body. The coalescer element, having no further metal parts, may then be simply incinerated.

The gaskets 20 and 21 can be constructed as a two-component element in which the first component 27 penetrates partially into the coalescer element to seal and bond the coalescer element to the supporting body. The second element 28 consists of an elastomeric material which provides a reliable radial seal.

Figure 2:
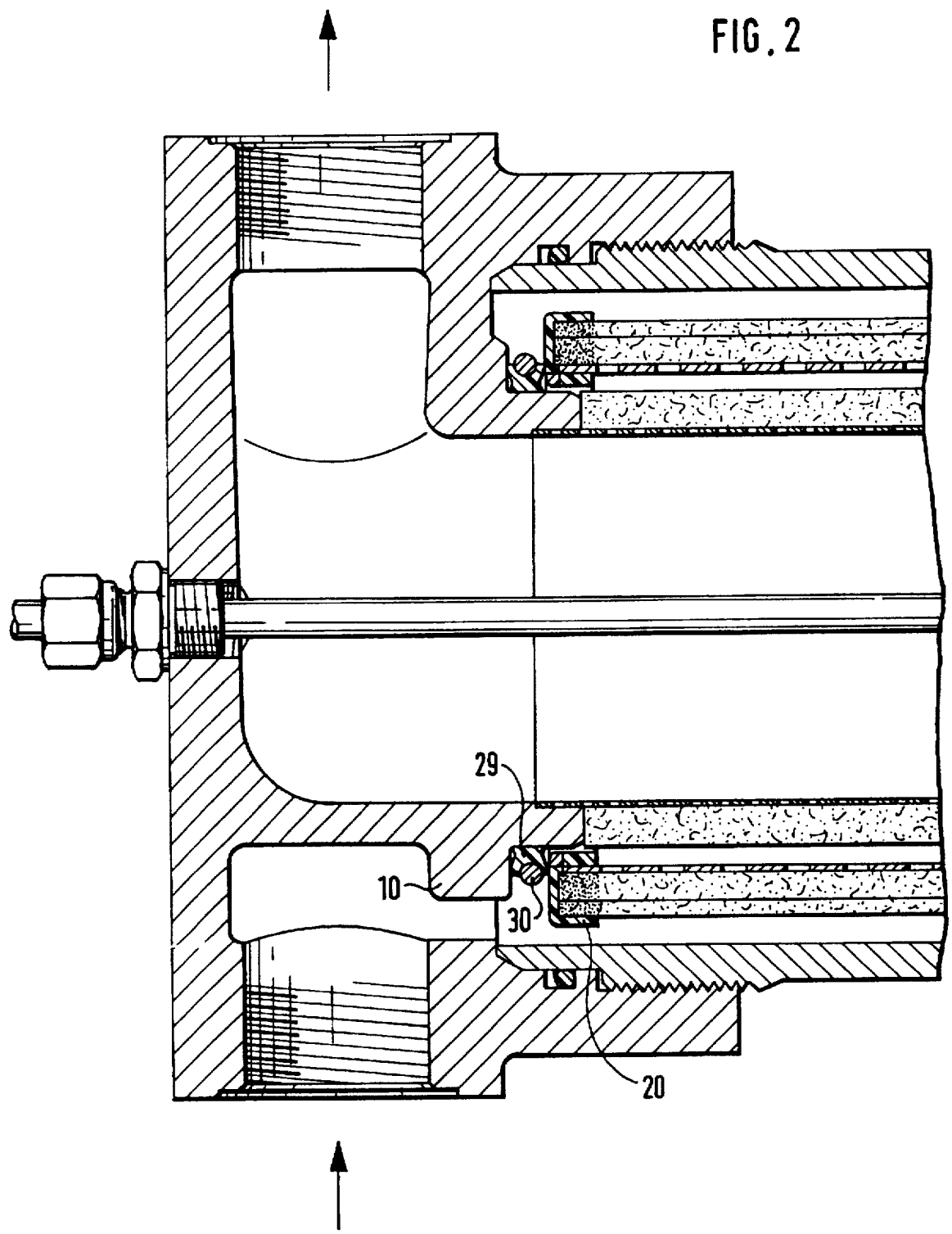
FIG. 2 is a detailed view of a sealing area of an oil separator.

FIG. 2 shows an alternative seal for the ends of the coalescer element. The gasket 20 of the coalescer element abuts a so-called wye gasket 29 disposed on the mounting head 10. In the illustrated embodiment, the wye gasket carries a reinforcing ring 30. However, if an appropriate elastomeric material is selected, such as rubber having a Shore A hardness of from about 40 to about 80, the wye gasket can produce a reliable radial seal even without the reinforcing ring.

Figure 3:
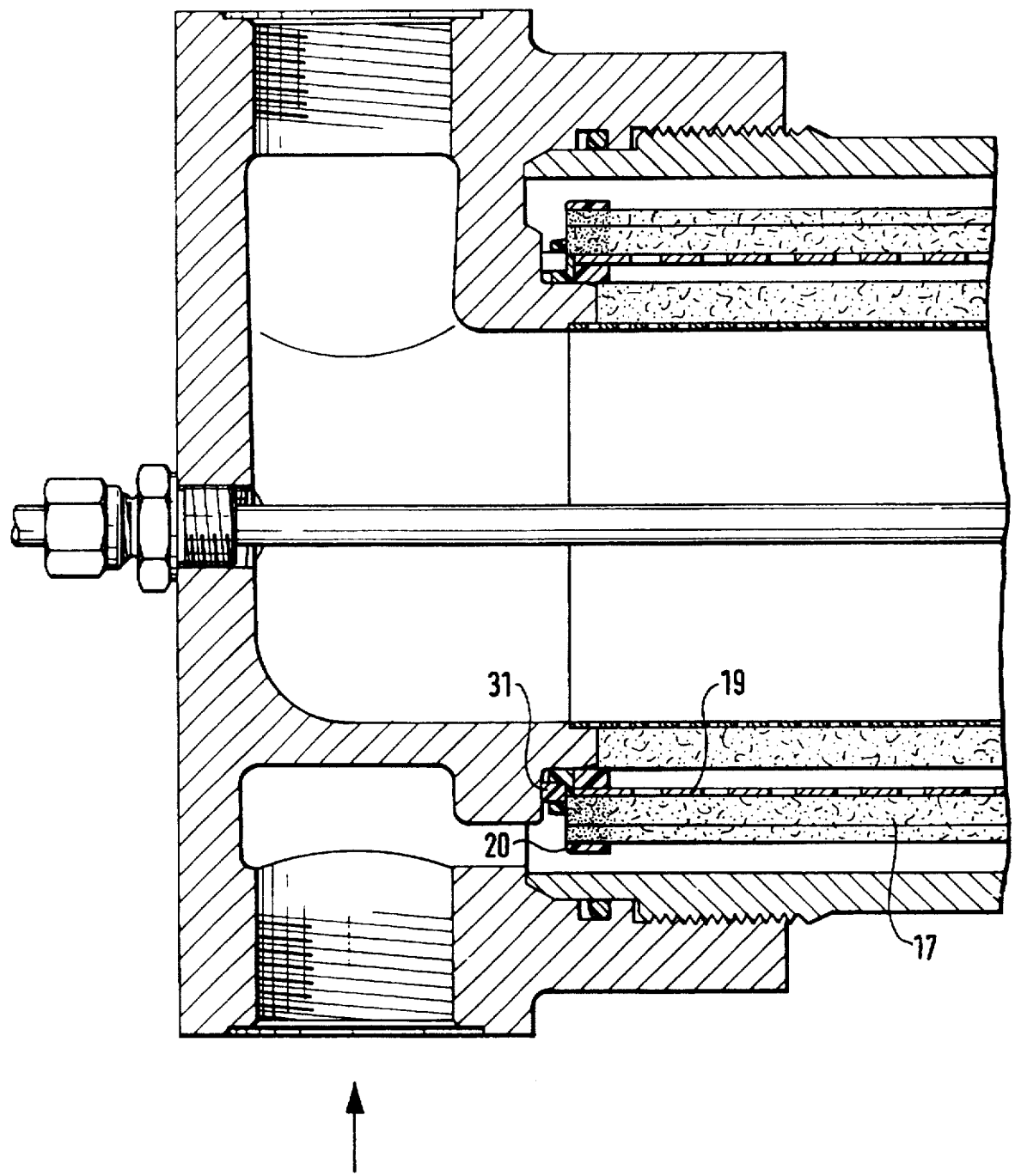
FIG. 3 is a detailed view of another sealing area of an oil separator.

FIG. 3 shows another variation of a seal for the ends of the coalescer element 17. Here a sealing ring 31 is disposed in the gasket 20 of the coalescer element 17. The end face of the gasket 20 is of such a shape as to assure a reliable fastening of the sealing ring 31. Of course, there are a great number of additional seal forms which could be used. For example it is also possible to use the coalescer material itself to form a seal. For this purpose the nonwoven material extends axially and radially beyond the supporting body 19. When the coalescer element is placed on the mounting head, a reliable seal will be established due to the resilience of the material on the face of the mounting head or on a flange-like sealing neck.

Figure 4:
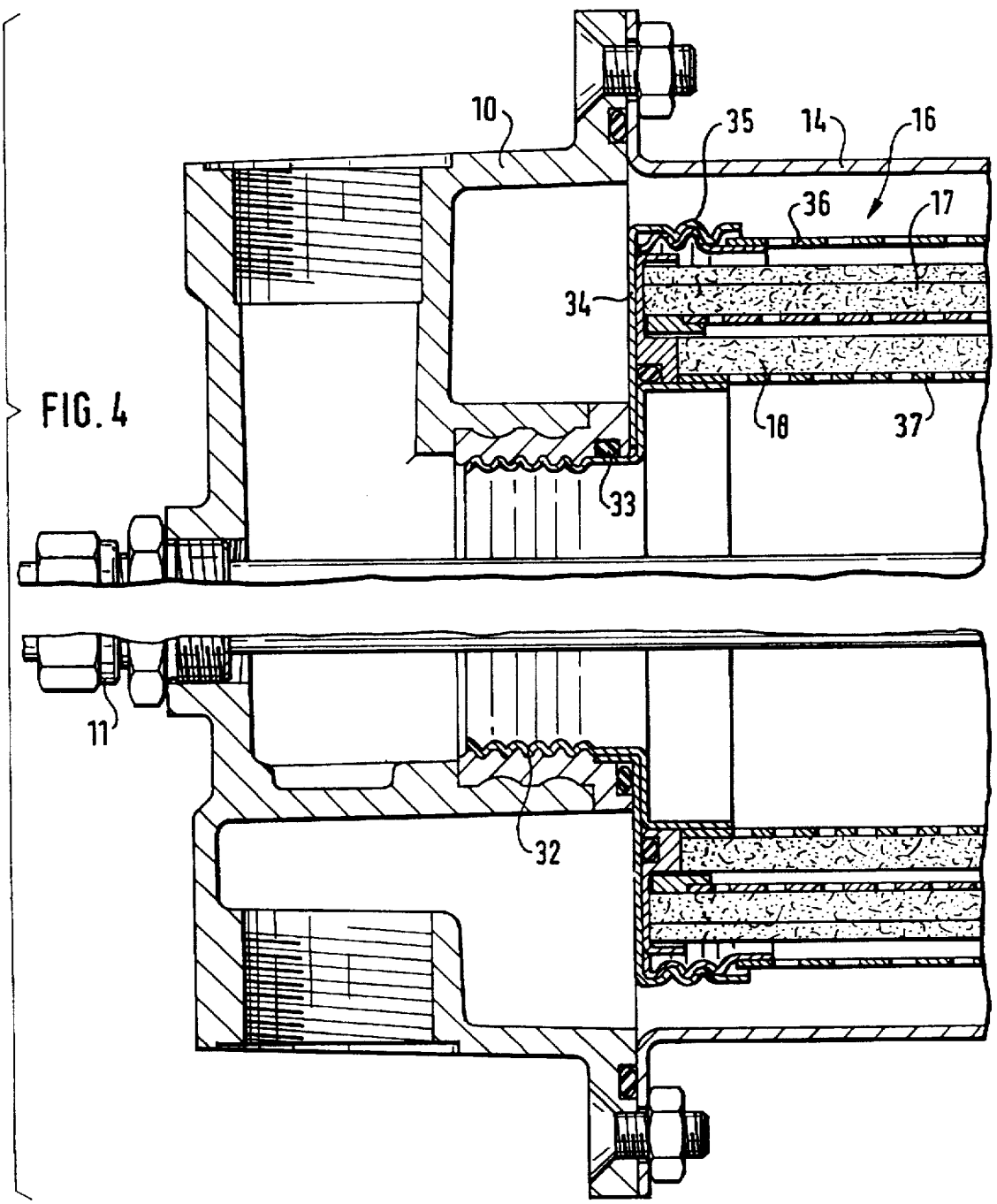
FIG. 4 a detailed view of a threaded fastening area of a filter element to the supporting body of an oil separator.

FIG. 4 shows an oil separator with an oil outlet tube 11, a mounting head 10 and a housing 14. The oil-removing element 16 is disposed on the mounting head 10 by means of screw thread 32. The sealing of the separating element is accomplished, for example, by an inserted annular gasket 33. The oil-removing element has a bottom-end disk 34 which is provided with an annular screw thread 35. This annular screw thread 35 serves to attach the outer jacket 36. In conjunction with the inner jacket 37 a fully enclosed oil-removing element 16 is thus created.

As it can be seen from FIG. 4, neither the coalescer element 17 nor the oil-removing element 16 requires an end-sealing disk. In this case the axial force applied by the outer jacket 36 suffices to join the two elements sealingly against the end plate 34. To assure that, when the oil-removing element 16 is to be replaced, it can first be unscrewed from the mounting head 10 without opening the annular screw thread 35 by this rotary action, it is desirable to provide the threads with different pitches; i.e. one of the threads is a right-hand thread and the other of the threads is a left-hand thread. Alternatively, the thread 32 can be provided with a lower coefficient of friction than the thread 35. After the oil-removing element 16 has been removed from the housing 14, the coalescer element 17 or the oil-separating element 18 can be replaced by unscrewing the annular screw thread 35.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An oil separator for separating oil from oil-charged air, said oil separator comprising a mounting member, a housing secured to said mounting member to form an enclosed chamber inside said housing, an inlet for admitting oil-charged air into said chamber, an air outlet for discharging filtered air from said chamber, an oil outlet for discharging separated oil from said chamber, a filter unit in said chamber interposed between said inlet and said air outlet, said filter unit comprising a support body, a coalescer element supported on a surface of said support body, and first and second end gaskets in which respective axial ends of said support body and said coalescer element are received, said end gaskets fastening said coalescer element to said support body and sealing said filter unit in said chamber, each of said first and second end gaskets comprising a molded component configured as a lipped gasket, and said coalescer element being releasable from said support body by separating said end gaskets, whereby said coalescer element can be disposed of separately from said support body.

2. An oil separator according to claim 1, wherein each of said first and second end gaskets comprises a molded component in which respective axial ends of said support body and said coalescer element are embedded to bond the coalescer element to the support body.

3. An oil separator according to claim 2, wherein each of said first and second end gaskets is a two component element comprising a first component which penetrates into the coalescer element to seal and bond the coalescer element to the support body and a second component which forms an elastomeric seal.

4. An oil separator according to claim 1, wherein said filter unit is mounted inside said chamber so as to be spaced from said housing, said filter unit being held between said mounting member and an end plate with one of said end gaskets sealingly contacting the mounting member and the other of said end gaskets sealingly contacting the end plate, and said end plate being secured by a central threaded bolt extending therethrough, whereby the housing can be detached from the mounting member without releasing the filter unit.

5. An oil separator according to claim 1, wherein said coalescer element comprises a nonwoven web material.

6. An oil separator according to claim 1, wherein said coalescer element comprises a foam material.

7. An oil separator according to claim 1, further comprising a separating unit in said chamber interposed between said filter unit and said air outlet.

8. An oil separator according to claim 7, wherein said separating unit comprises a separating element supported on a support tube.

9. An oil separator according to claim 8, wherein said separating unit engages said mounting member independently of said filter unit, and said filter unit can be exchanged separately from said separating unit.

10. An oil separator according to claim 7, wherein said separating element comprises a nonwoven web material.

11. An oil separator according to claim 7, wherein said separating element comprises a foam material.

\* \* \* \* \*